United States Patent [19]

Hatae et al.

[11] Patent Number: 4,594,608
[45] Date of Patent: Jun. 10, 1986

[54] TV-PHOTOGRAPHY SYSTEM FOR SURGICAL MICROSCOPE

[75] Inventors: Yasuhiko Hatae, Tokyo; Shigeaki Morimitsu, Hinode, both of Japan

[73] Assignee: Hitachi Denshi System Service Kabushiki Kaisha, Tokyo, Japan

[21] Appl. No.: 531,996

[22] Filed: Sep. 14, 1983

[30] Foreign Application Priority Data

Sep. 17, 1982 [JP] Japan .................................. 57-161007

[51] Int. Cl.[4] .............................................. H04N 7/18
[52] U.S. Cl. ......................................... 358/93; 354/79
[58] Field of Search ................... 358/93, 97, 101, 107, 358/345, 88, 3, 226; 354/75, 76, 79; 350/507, 520, 526

[56] References Cited

U.S. PATENT DOCUMENTS

| 2,974,573 | 3/1971 | Faasch | 354/79 X |
| 3,546,378 | 12/1970 | Kavikawa | 354/75 X |
| 3,883,689 | 5/1975 | Mansour et al. | 358/93 X |

OTHER PUBLICATIONS

"Instructions for the Use of the Telestill Photo Adapter", Designs for Vision, Inc., New York, NY 10010.

Primary Examiner—James J. Groody
Assistant Examiner—Victor R. Kostak
Attorney, Agent, or Firm—Oblon, Fisher, Spivak, McClelland & Maier

[57] ABSTRACT

A TV-photography system for a surgical microscope, said system being constructed in such a manner that an optical path, which extends from an objective lens to an eyepiece, is divided by a beam splitter and an imaging adapter equipped with a shiftable built-in mirror is positioned on a divided-out optical path so as to operably guide the divided-out optical path to either a television camera or a still photographic camera, which system comprises control means adapted to operate the shiftable built-in mirror and still photographic camera successively in accordance with a preset sequence so that, in the course of displaying a selected region on a monitor TV by means of the television camera, a still picture of the selected region can be automatically taken by inputting only a prescribed start signal to the control means. The above system enables to automatically take a series of still pictures without need for interrupting the operation. There is no danger to contaminate a sterilized drape which normally covers the surgical microscope. Resulting still pictures are absolutely free from camera-shake and are thus very sharp.

5 Claims, 4 Drawing Figures

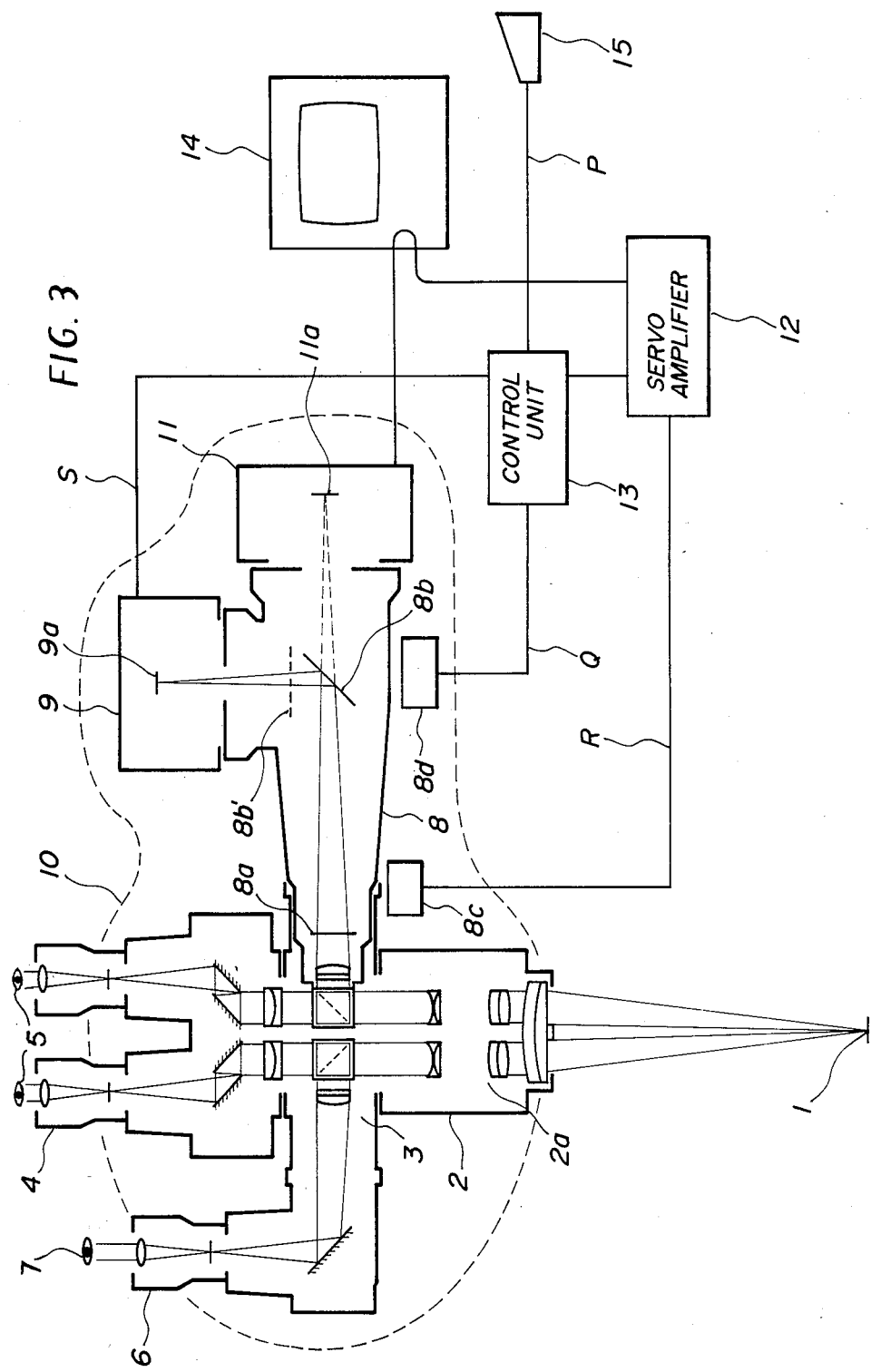

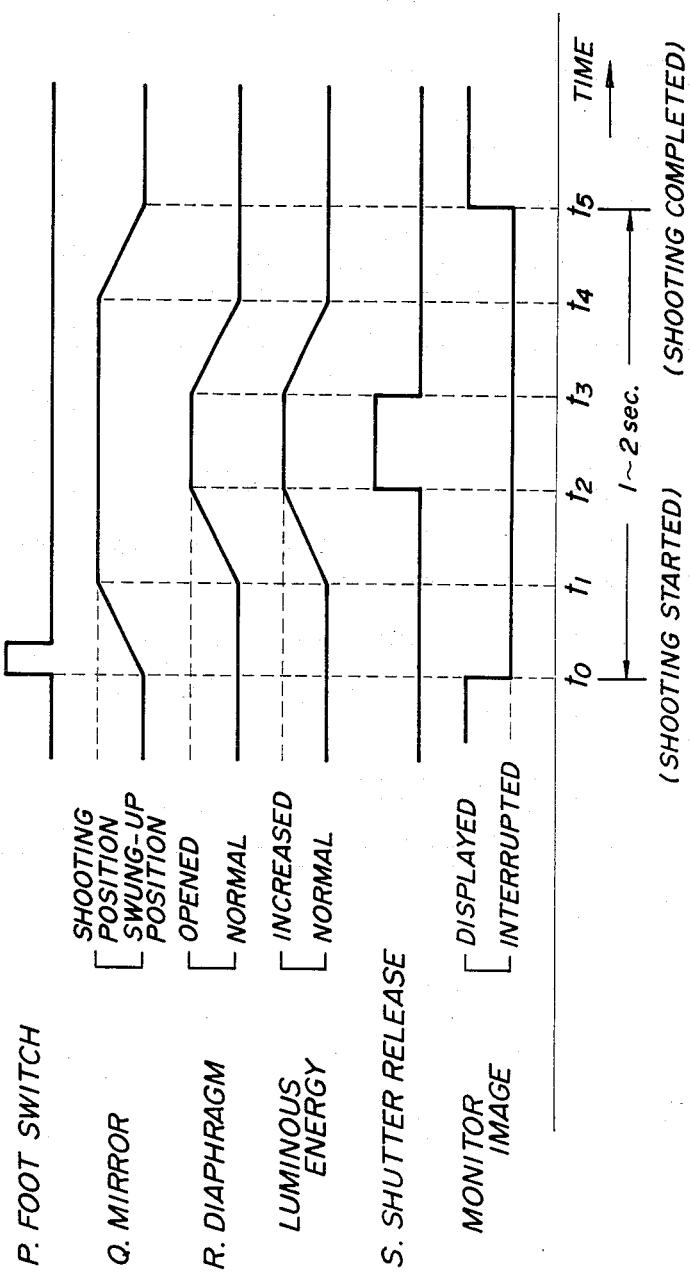

TV-PHOTOGRAPHY SYSTEM FOR SURGICAL MICROSCOPE

BACKGROUND OF THE INVENTION

1. Field of the Invention

This invention relates to a system adapted to display a visual field of a surgical microscope, which is used when operating a very small region in brain surgery, ophthalmology, otorhinology or the like, on an enlarged scale on a video monitor or to take a still picture of the visual field by a single action. The above system will hereinafter be called a "TV-photography system".

2. Description of the Prior Art

FIG. 1 is a schematic illustration of optical paths when a still photographic camera is combined with a surgical microscope. Light from a very small region 1, which is now under operation, travels through objective lenses 2a, beam splitter 3 and surgeon's eyepieces 5, all of which are provided with a main barrel 2 of the surgical microscope, to surgeon's eyes 5. A luminous flux which has been divided out by the beam splitter 3 and is shown at the lefthand side in the drawing runs through an assistant's eyepiece 6 and reaches the eye 7 of an assistant. On the other hand, a luminous flux which is shown at the righthand side in the drawing is adjusted in luminous energy by a diaphragm 8a of an imaging adapter 8 and then focused on a film surface 9a of a still photographic camera 9. A surgery must be carried out in an completely sterilized environment. It is however difficult to sterilize such a surgical microscope and camera completely. Therefore, the surgical microscope and camera are covered in their entirety by a sterilized drape 10 upon making a surgery, except for portions where the objective lenses and eyepieces are respectively located. In the above construction, the very small region, which is now under operation, is visible by the surgeon and his assistant only. In order to show the very small region to other staff in the operation room and/or observers at the same time, a television camera (not shown) is usually provided instead of the still photographic camera 9. The television camera is arranged in such a manner that its target assumes the position of the film surface 9a. When it had become necessary to record the details of a surgery on a still picture, it was conventionally required to interrupt the surgery for replacement of the television camera with the still photographic camera. It was a very difficult work to replace the television camera by the still photographic camera and, after taking a still picture, to put back the television camera within the sterilized drape 10, while paying attention to avoid any contamination of the sterilized drape 10.

With a view toward overcoming the drawback of the above-mentioned prior art system, it has been attempted, as depicted in FIG. 2, to provide an operable mirror (swingable mirror in this embodiment) 8b' with the imaging adapter 8 and, when taking a still picture, to manually swing down the mirror to a position indicated by 8b, thereby focusing an image on the film surface 9a of the still photographic camera 9. However, it does not only require special attention but also is unavoidable to interrupt the surgery for a long period of time to operate the imaging adapter 8 surrounded by the drape 10 so that the mirror is first of all swung down to the position indicated by 8b, to adjust the diaphragm 8a to a value suitable for still photography, and, after taking a still picture, to return the diaphragm 8a and mirror 8b to their normal value and position respectively.

SUMMARY OF THE INVENTION

With the foregoing in view, the present invention has as its object the provision of a system which, in the course of observing a selected region of an operated patient by a video monitor, permits to take a still picture of the selected region by a single action and, after taking the still picture, to automatically return to the observation by the video monitor.

In one aspect of this invention, there is thus provided a TV-photography system for a surgical microscope, said system being constructed in such a manner that an optical path, which extends from an objective lens to an eyepiece, is divided by a beam splitter and an imaging adapter equipped with a shiftable built-in mirror is positioned on a divided-out optical path so as to operably guide the divided-out optical path to either a television camera or a still photographic camera, which system comprises control means adapted to operate the shiftable built-in mirror and still photographic camera successively in accordance with a preset sequence so that, in the course of displaying a selected region on a video monitor by means of the television camera, a still picture of the selected region can be automatically taken by inputting only a prescribed start signal to the control means.

It is convenient to input the start signal by using a foot switch. The above system enables to automatically take a series of still pictures without need for interrupting the operation. There is no danger to contaminate the sterilized drape 10. The interruption of pictures on the monitor is as short as 1-2 seconds when a still picture is taken. The resulting still picture is absolutely free from camera-shake and is thus very sharp.

The above and other objects, features and advantages of the present invention will become apparent from the following description and the appended claims, taken in conjuction with the accompanying drawings.

BRIEF DESCRIPTION OF THE DRAWINGS

In the accompanying drawings:

FIG. 3 is a simplified functional block diagram of the structure of a surgical microscope incorporating the TV-photography system according to one embodiment of this invention, which microscope can be used for both taking still pictures of selected regions of a patient and displaying the selected regions on a video monitor; and FIG. 4 is a timing diagram illustrating the operation of the surgical microscope of FIG. 3.

DETAILED DESCRIPTION OF THE INVENTION AND PREFERRED EMBODIMENT

Figure 1:
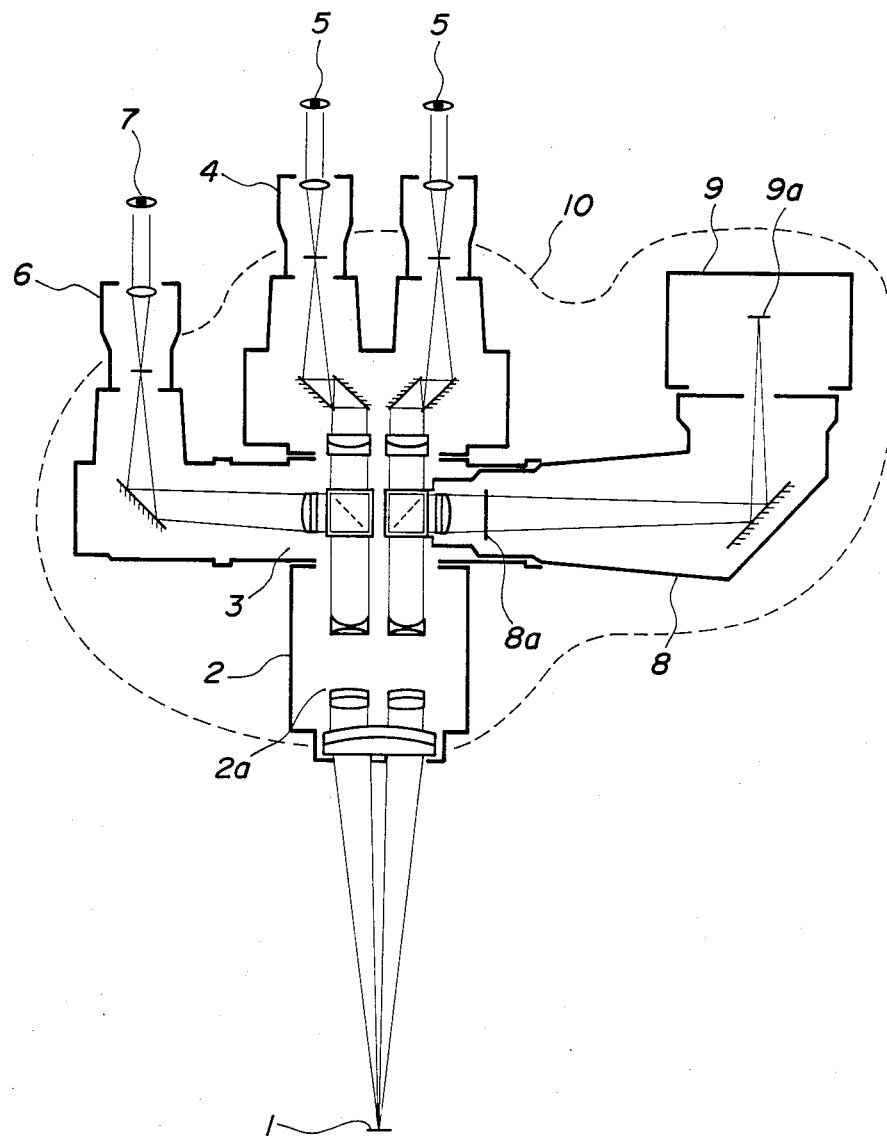
FIG. 1 a schematic illustration of optical paths when a still photographic camera is combined with a surgical microscope.
Figure 2:
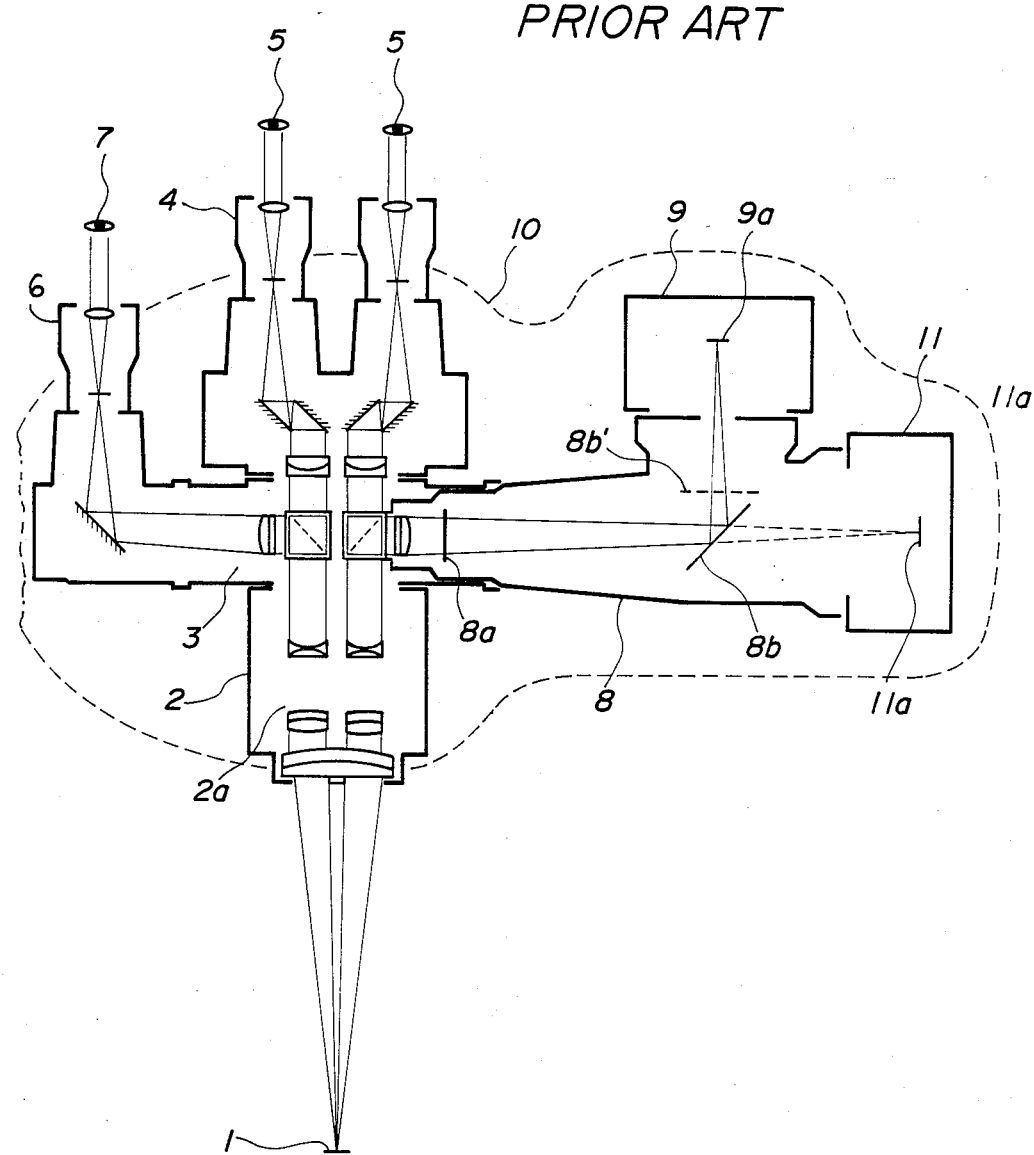
FIG. 2 is a simplified functional diagram of a conventional apparatus in which a still photographic camera and television camera are combined.

One embodiment of this invention is shown in FIG. 3. A diaphragm-driving servo motor 8c is coupled with the diaphragm 8a of the imaging adapter 8. While displaying on a video monitor 14, the servo motor 8c automatically controls the diaphragm 8a by means of a servo amplifier 12 so that the video output voltage of the television camera 11 is always kept at a constant level. A mirror-driving motor 8d is connected with the shiftable mirror 8b so that the mirror 8b may be swung up to the position indicated by 8b' or swung down to the position indicated by 8b.

The above embodiment of this invention will hereinafter be described further in detal with reference to the timing diagram of FIG. 4. The shiftable mirror is normally kept at the position indicated by 8b' so as to display an image of the very small region 1, which is subjected to surgery, on the video monitor 14. When a foot switch 15 is stepped at the time point when it has become necessary to record the small region on a still picture, i.e., at $t_o$ of FIG. 4, a photographing start signal P is delivered to a control unit 13. Then, a mirror swing-down signal Q is first of all fed from the control unit 13 to the mirror drive motor 8d. Thereafter, a diaphragm opening signal R is supplied at $t_1$ of FIG. 4 from the control unit 13, through the servo amplifier 12, to the diaphragm driving servo motor 8c. At the same time, a bright-up signal (not illustrated) is sent to a light source circuit (not shown) of the surgical microscope 2. When the diaphragm 8a has been opened to a prescribed extent, namely, at $t_2$ of FIG. 4, a shutter release signal S is delivered from the control unit 13 to the still photographic camera 9 and the film 9a is hence exposed to light. In the present embodiment, the diaphragm 8a is opened and the luminous energy of the light source is increased as mentioned above when taking a still picture. This permits to take the still picture at a practically-feasible fastest shutter speed, thereby successfully avoiding camera-shake. Either one of the diaphragm opening system and the bright-up system may be omitted because they are not absolutely indispensable for the operation of the TV-photography system according to this invention. At the time point $t_3$ of FIG. 4 where the exposure of the film 9a has been completed, signals are sent from the control unit 13 in order to lower the luminous energy of the light source of the surgical microscope 2 to the normal level and to close the diaphragm 8a to the normal extent. At the time point $t_4$ of FIG. 4, the control unit 13 outputs a signal to swing the shiftable mirror back to the normal position indicated by 8b'. The photographying has thus been completed at the time point $t_5$ of FIG. 4. Then, an image of the very small region 1, which is now under operation, is again displayed on the video monitor 14.

Having now fully described the invention, it will be apparent to one of ordinary skill in the art that many changes and modifications can be made thereto without departing from the spirit or scope of the invention as set forth herein.

What is claim is:

1. A TV-photography system for use in controlling a sterile surgical microscope system comprising:
   an objective lens;
   an eyepiece;
   a beam splitter placed in the optical path between said objective lens and said eyepiece for dividing the optical image produced from said objective lens;
   an imaging adapter positioned on said divided portion of said optical image;
   a shiftable mirror positioned in said imaging adapter for reflecting the divided optical image from said beam splitter;
   a means for placing a television camera in one of the optical paths of said shiftable mirror;
   a means for placing a still photographic camera in another optical path of said shiftable mirror; and
   shifting means for shifting the position of said shiftable mirror comprising:
      control means coupled to said shifting means and to the still photographic camera for successively operating said shiftable mirror and said still photographic camera in accordance with a present sequence; and
      humanly operable switch means coupled to said control means for providing a prescribed starting signal to said control means such that upon said control means receipt of said start signal said control means operates such that in the course of displaying a selected region being viewed by said objective lens through a video monitor coupled to the television camera, a still picture of said selective region is automatically taken.

2. A TV-photographic system as in claim 1, further comprising:
   an automatic diaphragm having a second control means operable in accordance with the video signal level of the television camera.

3. A TV-photographic system as in claim 2, further comprising:
   means for coupling said second control means to said automatic diaphragm such that when said still picture is being taken, said automatic diaphragm is maintained in an open position.

4. A TV-photographic system as in claim 1, further comprising:
   means for increasing the luminous energy of a light source said still camera is operative.

5. A TV-photographic system as in claim 2, further comprising:
   means for increasing the luminous energy of a light source when said still camera is operative.

* * * * *